United States Patent
Pereira et al.

(10) Patent No.: US 8,036,098 B2
(45) Date of Patent: Oct. 11, 2011

(54) WIRELESS NETWORK AND METHOD FOR ADAPTIVE OPPORTUNISTIC CLUSTERING FOR INTERFERENCE ALIGNMENT IN WIRELESS NETWORKS

(75) Inventors: Stephanie F. Pereira, Mississauga (CA); Feng Xue, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 12/426,382

(22) Filed: Apr. 20, 2009

(65) Prior Publication Data

US 2010/0265813 A1    Oct. 21, 2010

(51) Int. Cl.
*H04J 1/12*     (2006.01)
*H04J 1/00*     (2006.01)
*H04W 4/00*     (2009.01)

(52) U.S. Cl. ......... 370/201; 370/208; 370/328; 370/329
(58) Field of Classification Search ................... 370/201, 370/328, 332
See application file for complete search history.

(56) References Cited

U.S. PATENT DOCUMENTS

| | | | |
|---|---|---|---|
| 7,580,347 B2 * | 8/2009 | Geile et al. ..................... 370/208 |
| 2003/0003880 A1 * | 1/2003 | Ling et al. ....................... 455/92 |
| 2003/0128658 A1 * | 7/2003 | Walton et al. .................. 370/208 |
| 2005/0143014 A1 * | 6/2005 | Li et al. ............................ 455/69 |
| 2007/0274256 A1 * | 11/2007 | Murai et al. ................... 370/328 |
| 2007/0280099 A1 * | 12/2007 | Geile et al. ..................... 370/208 |
| 2007/0281746 A1 * | 12/2007 | Takano et al. ............. 455/562.1 |
| 2008/0188232 A1 | 8/2008 | Park et al. |
| 2008/0219194 A1 | 9/2008 | Kim et al. |
| 2009/0156154 A1 * | 6/2009 | Karabinis et al. ............. 455/307 |
| 2009/0270089 A1 * | 10/2009 | Karabinis ....................... 455/427 |
| 2010/0238821 A1 * | 9/2010 | Liu et al. ........................ 370/252 |

FOREIGN PATENT DOCUMENTS

| | | |
|---|---|---|
| KR | 20060096360 | 9/2006 |
| WO | WO-2010123700 A1 | 10/2010 |

OTHER PUBLICATIONS

Cadambe, V. R., et al., "Interference Alignment and Degrees of Freedom of the $K$-User Interference Channel", *IEEE Transactions on Information Theory*, 54(8), (Aug. 2008), 3425-3441.

Gomadam, K., et al., "Approaching the Capacity of Wireless Networks through Distributed Interference Alignment", *IEEE Global Telecommunications Conference, 2008. IEEE GLOBECOM 2008*, (2008), 1-6.

Rose, C., et al., "Wireless systems and interference avoidance", *IEEE Transactions on Wireless Communications,*, (Jul. 2002), 415-428.

"International Application Serial No. PCT/US2010/030481, Search Report mailed Aug. 25, 2010", 8 pgs.

"International Application Serial No. PCT/US2010/030481, Written Opinion mailed Aug. 25, 2010", 8 pgs.

* cited by examiner

*Primary Examiner* — Huy Vu
*Assistant Examiner* — Brandon Renner
(74) *Attorney, Agent, or Firm* — Schwegman, Lundberg & Woessner, P.A.; Gregory J. Gorrie

(57) ABSTRACT

Embodiments of a central scheduler and method for adaptive clustering are generally described herein. In some embodiments, a cluster of transmitter-receiver pairs is selected based on minimum singular values calculated from direct channel information and the selected pairs are instructed to perform an interference alignment technique.

15 Claims, 3 Drawing Sheets

DISTRIBUTED NETWORK

CENTRALIZED NETWORK

WIRELESS NETWORK AND METHOD FOR ADAPTIVE OPPORTUNISTIC CLUSTERING FOR INTERFERENCE ALIGNMENT IN WIRELESS NETWORKS

TECHNICAL FIELD

Embodiments pertain to wireless networks. Some embodiments pertain to wireless networks that use a centrally scheduled communication resource. Some embodiments pertain to multiple-input multiple-output (MIMO) communication devices.

BACKGROUND

One issue with wireless networks is interference between users. Some conventional interference management techniques either treat the interference as noise when the interference is weak, or attempt to decode the interference when the interference is strong. Some other conventional interference management techniques attempt to mitigate interference by orthogonalizing channel access by assigning different frequency channels or time slots to users. Some techniques use extra antennas to mitigate interference by creating nulls towards an un-intended receiver. Each of these conventional interference management techniques has drawbacks that result in reduced overall network capacity or throughput.

Thus, there is a general need for wireless networks and methods for mitigating interference that may increase overall network capacity or throughput.

DETAILED DESCRIPTION

The following description and the drawings sufficiently illustrate specific embodiments to enable those skilled in the art to practice them. Other embodiments may incorporate structural, logical, electrical, process, and other changes. Embodiments set forth in the claims encompass all available equivalents of those claims.

Figure 1:
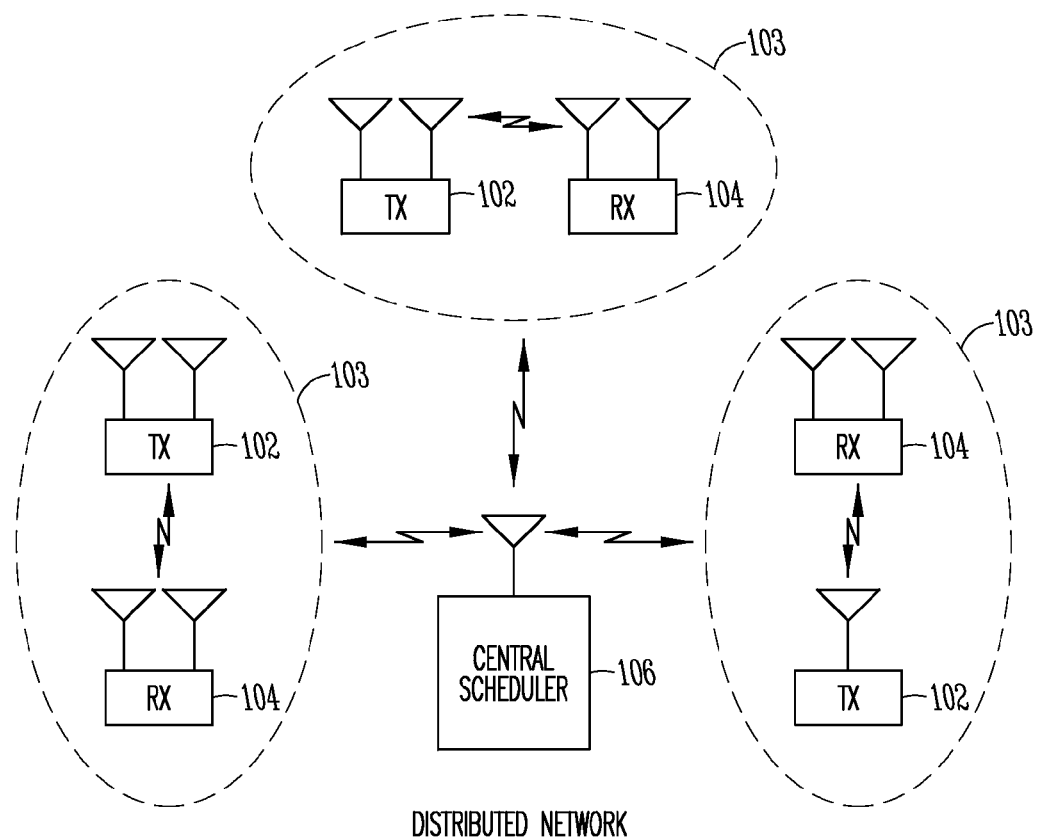
FIG. 1 illustrates a distributed wireless network, in accordance with some embodiments.

FIG. 1 illustrates a distributed wireless network, in accordance with some embodiments. The distributed wireless network illustrated in FIG. 1 includes a plurality of transmitters (TX) 102, a plurality of receivers (RX) 104 and a central scheduler 106. Transmitters 102 and receivers 104 may form transmitter-receiver pairs 103 that communicate directly with each other in accordance with a predetermined communication technique.

Transmitters 102 and receivers 104 may represent any type of wireless communication device which may have both transmit and receive capabilities. The central scheduler 106 may be a stand-alone wireless communication device configured to communicate wirelessly with transmitters 102 and receivers 104, or may be located within one of transmitters 102 or receivers 104.

In accordance with embodiments, a cluster or group of transmitter-receiver pairs 103 is selected by the central scheduler 106 based on thresholding of minimum singular values calculated from direct channel information. When a target throughput rate can be achieved by performing the interference alignment technique, the transmitter-receiver pairs 103 of the selected cluster are instructed to perform an interference alignment technique. When the target throughput rate is not able to be achieved by performing the interference alignment technique, a search may be performed to identify a cluster of transmitter-receiver pairs 103 that can achieve higher throughput when performing an interference alignment technique. These embodiments are described in more detail below.

In these embodiments, the interference alignment technique limits interfering signals from other transmitter-receiver pairs to a smaller signal space for improved decoding of desired signals. The use of interference alignment techniques allows multiple streams to be communicated simultaneously between two or more transmitter-receiver pairs 103. Since interference alignment techniques need synchronization and use full channel state information, an efficient scheduling technique is needed. Accordingly, some embodiments described herein provide, among other things, an efficient scheduling process for performing an interference alignment technique.

The distributed network of FIG. 1 may be almost any distributed type of network including an ad-hoc or mesh network, although the scope of the embodiments is not limited in this respect. In some embodiments, transmitters 102 and receivers 104 may utilize more than one antenna for communicating in accordance with a multiple-input multiple output (MIMO) technique, although the scope of the embodiments is not limited in this respect.

Figure 2:
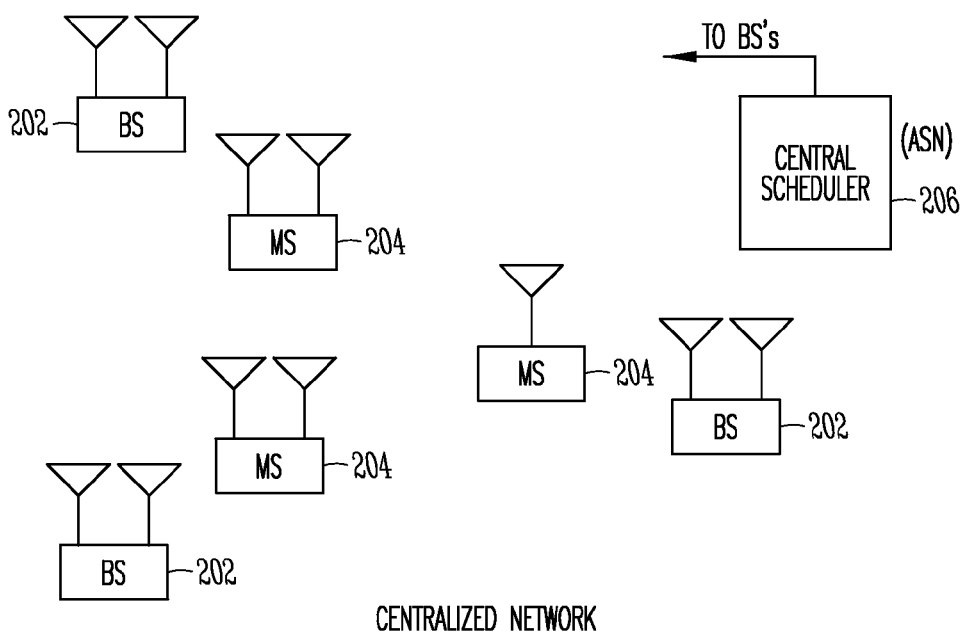
FIG. 2 illustrates a centralized wireless network, in accordance with some embodiments.

FIG. 2 illustrates a centralized wireless network, in accordance with some embodiments. The centralized wireless network illustrated in FIG. 2 comprises a plurality of base stations (BS) 202, a plurality of mobile stations (MS) 204 and a central scheduler 206. Base stations 202 and mobile stations 204 may have both transmit and receive capabilities and may be referred to herein as either a transmitter or a receiver. Base stations 202 and mobile stations 204 may comprise transmitter-receiver pairs that communicate in accordance with a predetermined communication technique. In these centralized network embodiments, one base station 202 may be paired with more than one mobile station 204. The central scheduler 206 may be located within one of base stations 202 or may be located within an access-service network (ASN) that communicates with the base stations 202 over a backbone network (not separately illustrated).

In accordance with embodiments, a cluster or group of transmitter-receiver pairs is selected by the central scheduler 206 based on thresholding of minimum singular values calculated from direct channel information. When a target throughput rate can be achieved by performing the interference alignment technique, the transmitter-receiver pairs of the selected cluster are instructed to perform an interference alignment technique. When the target throughput rate is not able to be achieved by performing the interference alignment technique, a search may be performed to identify a cluster of transmitter-receiver pairs that can achieve higher throughput when performing an interference alignment technique. In these embodiments, the transmitter-receiver pairs may comprise a single base station 202 and more than one mobile station 204, although this is not a requirement. These embodiments are described in more detail below.

The centralized network of FIG. 2 may be almost any type of wireless communication network, including a cellular network, in which base transceiver stations or access points are used to communicate with wireless communication devices. In some embodiments, base stations 202 and mobile stations 204 may utilize more than one antenna for communicating in accordance with a MIMO technique, although the scope of the embodiments is not limited in this respect.

Figure 3:
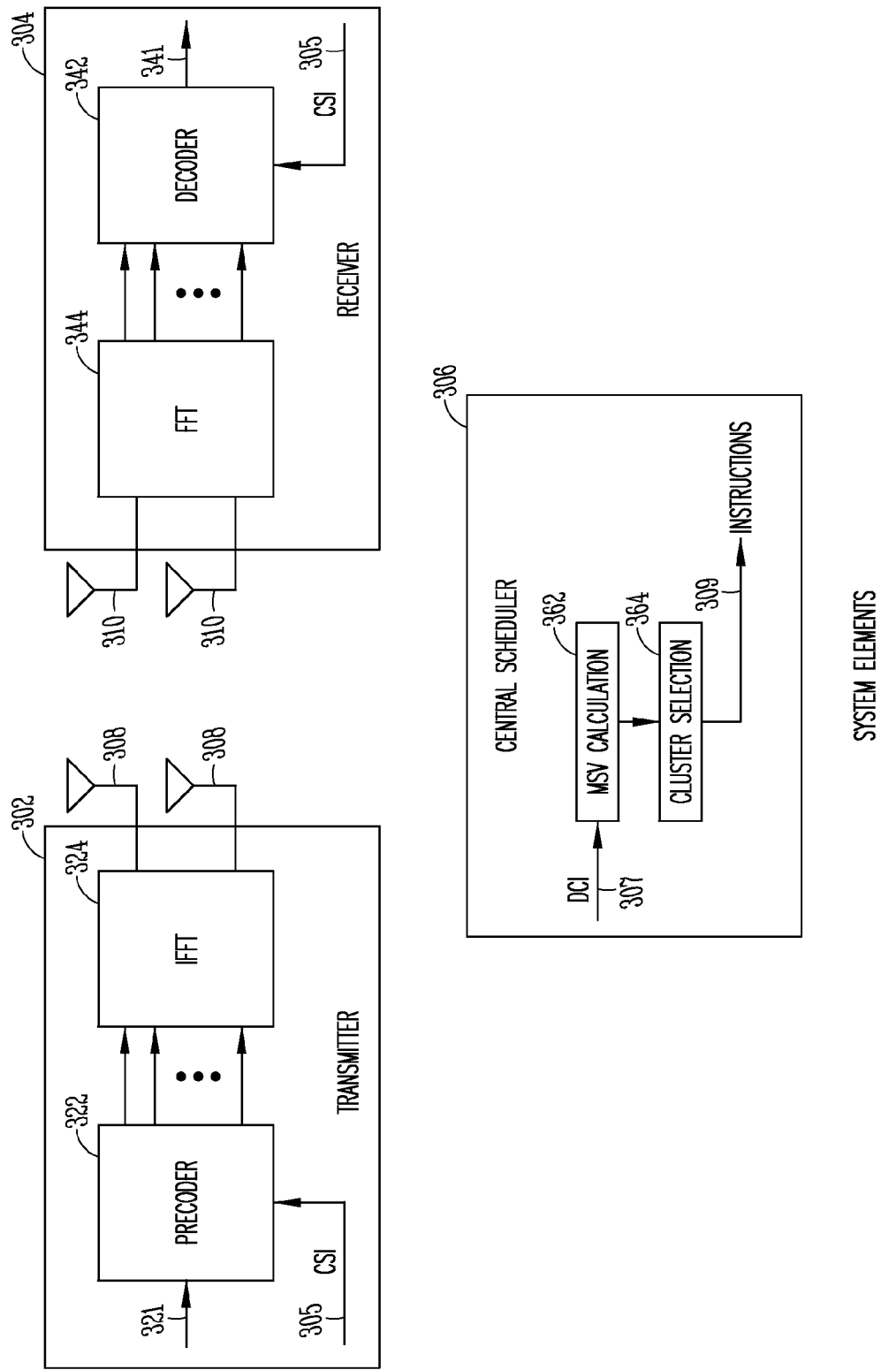
FIG. 3 illustrates functional diagrams of various system elements, in accordance with some embodiments.

FIG. 3 illustrates functional diagrams of various system elements, in accordance with some embodiments. The various system elements include a transmitter 302, a receiver 304 and a central scheduler 306. In distributed network embodiments, transmitter 302 may be suitable for use as one or more of transmitters 102 (FIG. 1), receiver 304 may be suitable for use as one or more of receivers 104 (FIG. 1) and the central scheduler 306 may be suitable for use as central scheduler 106 (FIG. 1). In centralized network embodiments, transmitter 302 may be suitable for use as one or more of base stations 202 (FIG. 2), receiver 304 may be suitable for use as one or more of mobile stations 204 (FIG. 2) and the central scheduler 306 may be suitable for use as central scheduler 206 (FIG. 1).

Transmitter 302 may include precoder 322 to precode signals 321, in accordance with an interference alignment technique, for transmission to an associated receiver, such as receiver 304, of a transmitter-receiver pair. The precoder 322 may precode the signals 321 based on channel state information (CSI) 305. Receiver 304 may include decoder 342 configured to decode the precoded signals received from the transmitter 302 of a transmitter-receiver pair and generate decoded signals 341. Central scheduler 306 may include cluster selection element 364 to select a cluster of the transmitter-receiver pairs, and to instruct the pairs of the selected cluster to perform an interference alignment technique for communicating therebetween. Transmitter 302 may utilize one or more antennas 308 and receiver 304 may utilize one or more antennas 310 for communicating.

In accordance with embodiments, the precoding by precoder 322 of transmitter 302 allows the decoder 342 of receiver 304 to mitigate and/or remove interference associated with transmissions of other transmitters of a selected cluster. These embodiments are described in more detail below. The channel state information 305 may represent the wireless channel between the transmitter 302 and the receiver 304 of the transmitter-receiver pair. In some embodiments, the decoder 342 may be configured to perform minimum mean-squared error (MMSE) decoding, while in other embodiments, the decoder 342 may be configured to perform zero-forcing (ZF) decoding using the channel state information 305. Other decoding techniques to decode interference-aligned precoded signals may also be used.

In accordance with multicarrier embodiments, transmitter 302 may include inverse fast Fourier transform (IFFT) circuitry 324 to convert frequency-domain subcarrier signals to the time-domain for transmission. Receiver 304 may include fast Fourier transform (FFT) circuitry 344 to convert received multicarrier signals to the frequency domain. In some embodiments, receiver 304 may include channel estimation (not separately illustrated) to estimate a channel response, and transmitter 302 may include channel compensation circuitry (not separately illustrated) to compensate for the channel response prior to precoding.

In some embodiments, the central scheduler 306 may select a cluster of transmitter-receiver pairs based on direct channel information (DCI) 307 for each of the transmitter-receiver pairs. In some embodiments, the central scheduler 306 may include minimum singular value (MSV) calculation element 362 to calculate a minimum singular value of the direct channel information 307 for each of the transmitter-receiver pairs and may select a cluster of transmitter-receiver pairs based on their minimum singular values. In some embodiments, a singular value decomposition (SVD) of the channel matrix may be performed to determine the singular values.

The central scheduler 306 may instruct the pairs of the selected cluster to perform an interference alignment technique for communicating therebetween by sending instructions 309 to the pairs of the selected cluster. In response to being instructed by the central scheduler 306 to perform an interference alignment technique, the transmitters of each transmitter-receiver pair of the selected cluster are configured to precode baseband signals 321, in accordance with the interference alignment technique for transmission to the associated receiver of each transmitter-receiver pair, using the channel state information 305.

In some embodiments, the central scheduler 306 may request the direct channel information 307 from transmitter-receiver pairs, and/or transmitter-receiver pairs may be configured to send their direct channel information 307 to the central scheduler 306. The channel state information 305 may include both a direct-channel gain estimate and a cross-channel gain estimate of the channel between the transmitter-receiver pair. The direct channel information 307 includes the direct-channel gain estimate of the channel between an associated receiver transmitter pair.

In these embodiments, the direct channel information 307 is used by the central scheduler 306 in determining the minimum singular value of the direct channel for use in selecting the pairs for clustering. The channel state information 305 is used by the transmitters and receivers of each selected transmitter-receiver pair to precode and decode transmitted and received signals. In these embodiments, it is not necessary for the central scheduler 306 to use cross-channel information (i.e., the cross-channel gain estimates) in selecting pairs for clustering. Pairs that are clustered may include users that are at a conference or who are crowded into a limited space such as a room or a building. The use of an interference alignment technique may allow the users to improve their data rate or quality of service (QoS) and may be applicable in any interference-limited environment to improve system throughput or QoS.

In some embodiments, the central scheduler 306 may select transmitter-receiver pairs for clustering that have the greatest minimum singular values above a predetermined threshold (T). In these embodiments, central scheduler 306 may select the transmitter-receiver pairs with the greatest minimum singular value from a set of transmitter-receiver pairs having a minimum singular value that exceeds the predetermined threshold. If an insufficient number of transmitter-receiver pairs have a minimum singular value above the predetermined threshold, the central scheduler 306 may refrain from selecting pairs for clustering based on minimum singular values.

In these embodiments, a predetermined number (k) of transmitter-receiver pairs may be selected for the cluster size. In some embodiments, k may be three, although the scope of the embodiments is not limited in this respect as k may range from as little as two to up to ten or more. System requirements and the complexity of the interference alignment technique to be used to determine k. In these embodiments, k may be a number of transmitter-receiver pairs suitable for performing an interference alignment technique without excessive complexity.

Each transmitter-receiver pair selected for clustering may be assigned a non-orthogonal channel resource for concurrent communication. The non-orthogonal channel resource may comprise an interfering or overlapping channel, such as the same time-slot and set of subcarriers, although the scope of the embodiments is not limited in this respect. The preceding of signals prior to transmission allows the use of non-orthogonal channel resources by transmitter-receiver pairs of a selected cluster.

In some embodiments, prior to instructing the pairs of the selected cluster to perform the interference alignment technique, the central scheduler 306 may calculate a sum rate for the transmitter-receiver pairs of the selected cluster. The central scheduler 306 may instruct the pairs of the selected cluster to perform the interference alignment technique when the sum rate meets or exceed a target throughput rate (R). The sum rate may be the rate that is achievable if all of the pairs of the selected cluster were to perform the interference alignment technique. The sum rate may be calculated by summing a throughput of each of the transmitter-receiver pairs of the selected cluster.

In some embodiments, the interference alignment technique may be either an interference-centric interference alignment technique or a maximum signal-to-interference and noise ratio (SINR) interference alignment technique. The interference-centric interference alignment technique may calculate precoding directions aiming at eliminating interference. The interference-centric interference alignment technique may include precoding signals 321 for transmission in directions to reduce interference.

The maximum SINR interference alignment technique may calculate precoding directions to trade-off eliminating interference with transmitting along better directions. The maximum SINR interference alignment technique may include precoding signals 321 for transmission in directions selected to trade-off the elimination of interference with improved reception. In some embodiments, the directional transmission of signals may be performed by beamforming techniques, although this is not a requirement.

In some embodiments, the interference alignment technique may align multiple interferences into a common subspace (e.g., a smaller signal space) at each receiver by preceding signals prior to transmission. The interference alignment technique described in the paper entitled "Interference Alignment and Degrees of Freedom of the K-user Interference Channel," *IEEE Transactions on Information Theory*, August 2008, Vol. 54, Issue 8, pp. 3425-34441 by V. R. Cadambe and S. A. Jafar, may be suitable for use as the interference-centric interference alignment technique, although the scope of the embodiments is not limited in this respect as other interference alignment techniques may also be suitable. The interference alignment technique described in the paper entitled "Approaching the Capacity of Wireless Networks Through Distributed Interference Alignment," Cornell Univ. arXiv: 0803.3816v1 [cs.IT], Mar. 26, 2008 by K. Gomadam, V. R. Cadambe and S. A. Jafar, may be suitable for use as the SINR interference alignment technique, although the scope of the embodiments is not limited in this respect as other interference alignment techniques may also be suitable. In these embodiments, the SINR interference alignment technique may be used when the channel is reciprocal after channel compensation.

In accordance with embodiments, when the sum rate does not meet or exceed the target throughput rate (i.e., no cluster identified by the minimum singular value thresholding described above can provide a throughput above the target), a subset search process may be initiated to identify a cluster for performing an interference alignment technique. In these embodiments, the central scheduler 306 may randomly select a set of (k+c) transmitter-receiver pairs from the plurality and request full-channel information for each of the selected transmitter-receiver pairs. The number of pairs selected may be greater than k. The number of pairs selected may be represented by k+c, where c is an additional number of pairs.

As part of the subset search process, the central scheduler 306 may request full-channel information for each of the selected transmitter-receiver pairs and may compute the achievable sum rate for each possible cluster of k pairs within the selected set (i.e., there are (k+c!)/(k!c!) possible clusters). The central scheduler 306 may select a cluster of k pairs with the highest achievable sum rate and instruct the k pairs of the selected cluster to perform an interference alignment technique. In these embodiments, to compute the achievable sum rate, the central scheduler 306 may use full-channel information comprising both direct channel information and cross channel information. The achievable sum rate may be calculated by summing a throughput of each of the transmitter-receiver pairs of the selected cluster if all of the transmitter-receiver pairs of the selected cluster were to perform an interference alignment technique. In these embodiments, the additional number of transmitter-receiver pairs (i.e., c) of the randomly selected set may be at least one.

As part of the subset search process, the central scheduler 306 may randomly choose k+c transmitter-receiver pairs and perform an exhaustive search of each cluster of k pairs to identify a cluster of k pairs with the highest achievable sum rate. Even with the value of c being as small as one, a significant improvement in performance may be achievable. In these embodiments, the central scheduler 306 may use full channel information rather than only direct channel information, as discussed above, when pairs are selected based on their minimum singular value.

In MIMO embodiments, the precoder 322 may precode signals 321 to direct the transmitted signals in a direction to mitigate interference. In some of these embodiments, the preceding may include direction selection by beamforming for transmission and reception of signals. Since interference is aligned by the preceding, the transmitter 302 may project a signal in a direction which maximizes SINR. The preceding allows a transmitter 302 to transmit along different signal directions so that the decoder 342 can differentiate signals. In these embodiments, the preceding and beamforming may include weight distribution and/or power distribution for antennas 308 and antennas 310.

Antennas 308 and antennas 310 may comprise directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In MIMO embodiments, the antennas are effectively separated to take advantage of spatial diversity and the different channel characteristics that may result between the transmitter 302 and the receiver 304. In some MIMO embodiments, the antennas may be separated by up to 1/10 of a wavelength or more, although this is not a requirement. In some embodiments, beamforming techniques may be employed as part of the preceding.

Although transmitter 302, receiver 304 and the central scheduler 306 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, the central scheduler 306 may include circuitry to calculate a minimum singular value from direct channel information of each of a plurality of transmitter-receiver pairs, circuitry to select a cluster of the transmitter-receiver pairs based on the minimum singular values calculated for each of the pairs, and circuitry to instruct the pairs of the selected cluster to perform an interference alignment technique when the target throughput rate (R) can be achieved. The central scheduler 306 may also include circuitry to calculate a sum rate for the transmitter-receiver pairs of the selected cluster. The circuitry to instruct may instruct the pairs of the selected cluster to perform the interference alignment technique when the sum rate meets or exceeds a target throughput rate. The sum rate may be calculated by summing a throughput of each of the transmitter-receiver pairs of the selected cluster if all of the pairs were to perform the interference alignment technique.

In these embodiments, the circuitry to select a cluster may be configured to select transmitter-receiver pairs having the greatest minimum singular values above the predetermined threshold (T) for the cluster. When the sum rate does not meet or exceed the target throughput rate, the circuitry to select a cluster may be configured to randomly select a set of k+c transmitter-receiver pairs from the plurality, compute an achievable sum rate for each possible cluster of k pairs within the selected set, and select the cluster with the highest achievable sum rate from the possible clusters for performing an interference alignment technique. The randomly selected set may comprise a predetermined number (k+c) of transmitter-receiver pairs and each cluster may comprise a subset having less transmitter-receiver pairs (i.e., k pairs) than the randomly selected set.

In some embodiments, transmitter 302 and receiver 304 may be configured to communicate orthogonal frequency division multiplexed (OFDM) communication signals over a multicarrier communication channel. The OFDM signals may comprise a plurality of orthogonal subcarriers. In some of these multicarrier embodiments, transmitter 302 may be an access point (AP), and receiver 304 may be a Wireless Fidelity (WiFi) device. In some broadband multicarrier embodiments, transmitter 302 may be part of a broadband wireless access (BWA) network communication station, such as a Worldwide Interoperability for Microwave Access (WiMAX) communication station, although the scope of the embodiments is not limited in this respect. In these broadband multicarrier embodiments, transmitter 302 and receiver 304 may be configured to communicate in accordance with an orthogonal frequency division multiple access (OFDMA) technique.

In some embodiments, transmitter 302 and receiver 304 may be configured to communicate in accordance with specific communication standards, such as the Institute of Electrical and Electronics Engineers (IEEE) standards including IEEE 802.11-2007 and/or 802.11(n) standards and/or proposed specifications for wireless local area networks (WLANs), although the scope of the embodiments is not limited in this respect as they may also be suitable to transmit and/or receive communications in accordance with other techniques and standards. In some embodiments, transmitter 302 and receiver 304 may be configured to communicate in accordance with the IEEE 802.16-2004 and the IEEE 802.16 (e) standards for wireless metropolitan area networks (WMANs) including variations and evolutions thereof, although the scope of the embodiments is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999," and Metropolitan Area Networks—Specific Requirements—Part 16: "Air Interface for Fixed Broadband Wireless Access Systems," May 2005 and related amendments/versions.

In some broadband embodiments, transmitter 302 and receiver 304 may be configured to communicate in accordance with the Universal Terrestrial Radio Access Network (UTRAN) or a Long-Term-Evolution (LTE) LTE communication standards. For more information with respect to UTRAN LTE standards, see the 3rd Generation Partnership Project (3GPP) standards for UTRAN-LTE, release 8, March 2008, including variations and evolutions thereof. In these LTE embodiments, mobile stations may transmit to an associated base station using single-carrier uplinks, base stations may communicate with mobile stations using multicarrier downlinks, mobile stations of the selected pairs may perform the interference alignment technique when transmitting to the associated base station over a single carrier uplink, and the base stations of the selected pairs may perform an interference alignment technique when transmitting to the associated mobile stations over a multicarrier downlink.

In some embodiments, receiver 304 may comprise a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

Figure 4:
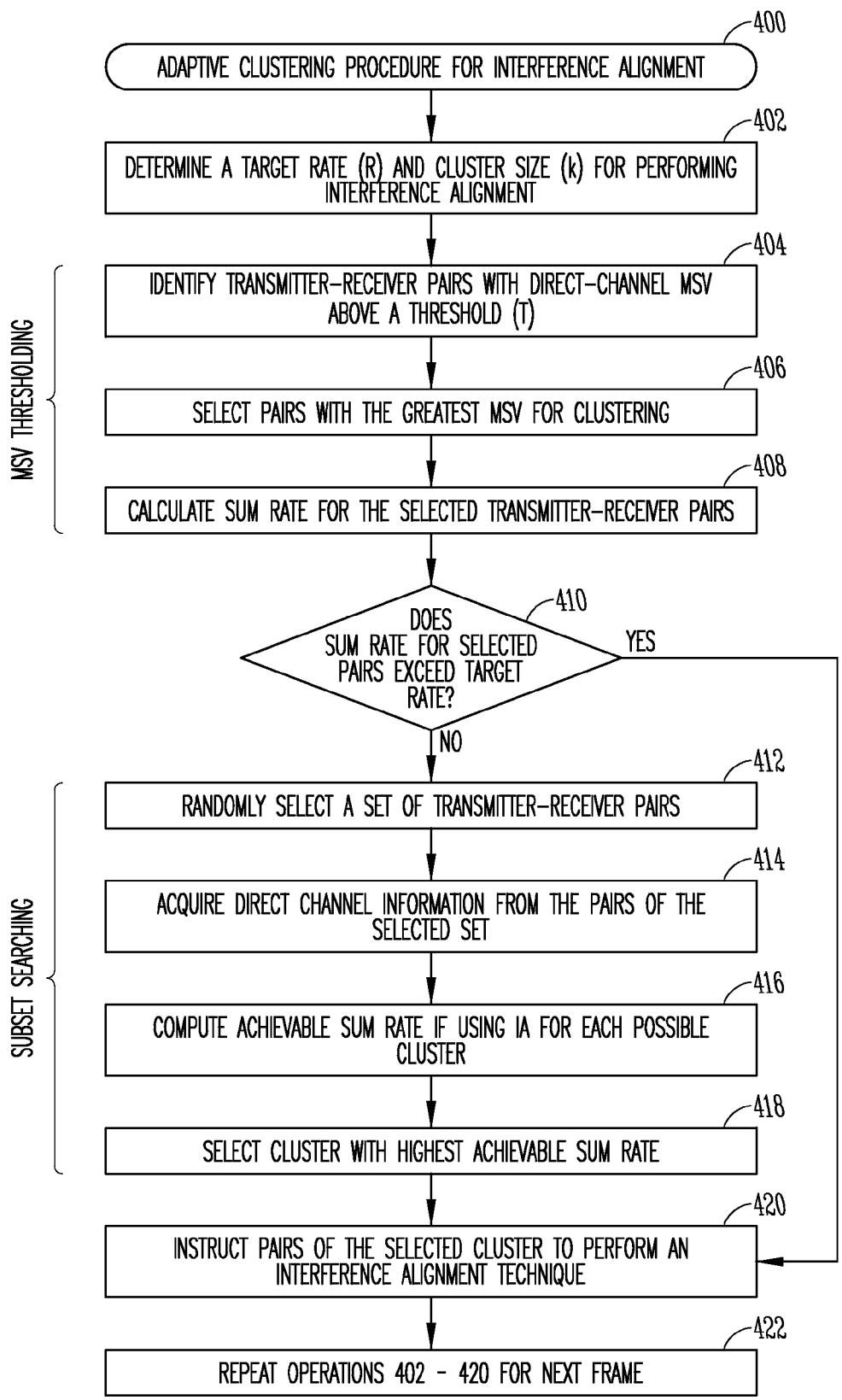
FIG. 4 is a flow chart of an adaptive clustering procedure for interference alignment, in accordance with some embodiments.

FIG. 4 is a flow chart of an adaptive clustering procedure for interference alignment technique, in accordance with some embodiments. Adaptive clustering procedure 400 may be performed by a central scheduler, such as central scheduler 106 (FIG. 1), central scheduler 206 (FIG. 2) or central scheduler 306 (FIG. 3). Adaptive clustering procedure 400 selects a cluster or group of transmitter-receiver pairs based on thresholding of minimum singular values calculated from direct channel information. The transmitter-receiver pairs of the selected cluster are instructed to perform an interference alignment technique when a target throughput rate can be achieved. When the target throughput rate is not able to be achieved by performing the interference alignment technique, a subset search process may be performed to identify a cluster of transmitter-receiver pairs that can achieve higher throughput when performing an interference alignment technique.

In operation 402, the target throughput rate (R) and the cluster size (k) may be determined for performing an interference alignment technique.

In operation 404, transmitter-receiver pairs are identified that have a minimum singular value of their direct channel above the predetermined threshold (T).

In operation 406, transmitter-receiver pairs are selected with greatest minimum singular values for clustering. A cluster of k transmitter-receiver pairs may be selected for the cluster.

In operation 408, the sum-rate may be calculated for the selected transmitter-receiver pairs of the cluster.

Operation 410 determines whether the sum rate for the selected transmitter-receiver pairs exceeds the target throughput rate. When the sum rate for the selected transmitter-receiver pairs exceeds the target throughput rate, the cluster selected in operation 406 based on minimum singular value thresholding is suitable for performing an interference alignment technique and operation 420 is performed. When the sum rate for the selected transmitter-receiver pairs does not exceed the target throughput rate, the cluster selected in operation 406 based on minimum singular value thresholding is not suitable for performing an interference alignment technique and operations 412-418 are performed to select a new cluster based on the subset search process.

In operation 412, a set of k+c transmitter-receiver pairs are randomly selected.

In operation 414, direct channel information is acquired for the set of randomly selected pairs.

In operation 416, the achievable sum rate is calculated for each possible cluster of k transmitter-receiver pairs of the set selected in operation 412. The sum rates calculated for each possible cluster may be based on the application of an interference alignment technique. The sum rates may indicate an increased overall throughput that can be achieved by the application of an interference alignment technique.

In operation 418, a cluster may be selected having the highest achievable sum rate.

In operation 420, the transmitter-receiver pairs of the selected cluster selected in either operation 406 or 418 are instructed to perform an interference alignment technique.

Operation 422 comprises repeating operations 402 through 420 for a next time period, such as the next frame.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A central scheduler for a distributed network is configured to schedule communications between transmitters and receivers of a plurality of transmitter-receiver pairs of the distributed network, wherein each transmitter-receiver pair includes a transmitter and an associated receiver, wherein the central scheduler is configured to:

select a cluster of the transmitter-receiver pairs having greatest of a minimum singular value above a threshold of direct channel information of a direct channel between a transmitter and receiver of each of the pairs; and instruct the transmitter-receiver pairs of the selected cluster to perform an interference alignment technique for direct communications therebetween, the interference alignment technique using channel state information, wherein in response to being instructed by the central scheduler, each transmitter of the selected cluster is configured to precode baseband signals in accordance with the interference alignment technique for transmission to an associated receiver of the selected cluster using the channel state information, and wherein each transmitter of the selected cluster is configured to concurrently transmit the precoded signals to an associated receiver using non-orthogonal subcarriers.

2. The central scheduler of claim 1 wherein the channel state information comprises both a direct-channel gain estimate and a cross-channel gain estimate, wherein the direct channel information comprises the direct-channel gain estimate, wherein the interference alignment technique comprises limiting interfering signals to a smaller signal space for improved decoding of desired signals, and wherein each transmitter-receiver pair is assigned a non-orthogonal channel resource for concurrent communication.

3. The central scheduler of claim 1 wherein prior to instructing the pairs of the selected cluster to perform the interference alignment technique, the central scheduler is configured to:

calculate a sum rate for the transmitter-receiver pairs of the selected cluster; and instruct the pairs of the selected cluster to perform the interference alignment technique when the sum rate meets or exceeds a target throughput rate, and wherein the sum rate is calculated by summing a throughput of each of the transmitter-receiver pairs of the selected cluster if the pairs were to perform the interference alignment technique.

4. The central scheduler of claim 3 wherein the interference alignment technique comprises either an interference-centric interference alignment technique or a maximum signal-to-interference and noise ratio interference alignment technique.

5. The central scheduler of claim 3 wherein when the sum rate does not meet or exceed the target throughput rate, the central scheduler is further configured to:

randomly select a set of transmitter-receiver pairs from the plurality;

compute an achievable sum rate for each possible cluster of pairs within the selected set;

select the cluster with the highest achievable sum rate; and instruct the pairs of the selected cluster to perform the interference alignment technique, wherein the randomly selected set of comprises a predetermined number of transmitter-receiver pairs, and wherein each cluster comprises a subset having less transmitter-receiver pairs than the randomly selected set.

6. The central scheduler of claim 5 wherein after randomly selecting the set of transmitter-receiver pairs from the plurality, the central scheduler is configured to request full-channel information for each transmitter-receiver pair of the selected set, wherein to compute the achievable sum rate, the central scheduler uses full-channel information comprising both the direct channel information and cross channel information, and wherein the achievable sum rate is calculated by summing the throughput of each of the transmitter-receiver pairs of the selected cluster if the pairs were to perform the interference alignment technique.

7. The central scheduler of claim 2 wherein the transmitters of each of the transmitter-receiver pairs comprise a precoder to precode signals in accordance with the interference alignment technique for transmission to the associated receiver of each transmitter-receiver pair, the precoder to precode the signals based on the channel state information of a channel therebetween, and wherein each associated receiver comprises a decoder configured to decode the precoded signals received from the transmitter of the pair, the precoding being configured to allow the decoder to remove interference associated with transmissions of other transmitters of the cluster.

8. A method for adaptive clustering performed by a central scheduler in a distrusted network comprising a plurality of transmitter-receiver pairs configured to communicate directly therebetween, the method comprising:

selecting a cluster of transmitter-receiver pairs having greatest of a minimum singular value above a threshold of direct channel information of a direct channel between a transmitter and receiver of each of the pairs; and instructing the transmitter-receiver pairs of the selected cluster to perform an interference alignment technique for direct communications therebetween when a target throughput rate can be achieved, wherein in response to being instructed by the central scheduler, each transmitter of the selected cluster is configured to precode baseband signals in accordance with the interference alignment technique for transmission to an associated receiver of the selected cluster using the channel state information, wherein each transmitter of the selected cluster is configured to concurrently transmit the precoded signals to an associated receiver using non-orthogonal subcarriers, and wherein performing the interference alignment technique provides an increase an overall achievable throughput for the pairs of the selected cluster.

9. The method of claim 8 wherein prior to instructing, the method includes:

calculating a sum rate for the transmitter-receiver pairs of the selected cluster; and instructing the pairs of the selected cluster to perform the interference alignment technique when the sum rate meets or exceed a target throughput rate, wherein the sum rate is calculated by summing a throughput of each of the transmitter-receiver pairs of the selected cluster if the pairs were to perform the interference alignment technique.

10. The method of claim 9 wherein when the sum rate does not meet or exceed the target throughput rate, the method further comprises:

randomly selecting a set of transmitter-receiver pairs from the plurality;

computing an achievable sum rate for each possible cluster of pairs within the selected set;

selecting the cluster with the highest achievable sum rate; and instructing the pairs of the selected cluster to perform the interference alignment technique, wherein the randomly selected set of comprises a predetermined number of transmitter-receiver pairs, wherein each cluster comprises a subset having less transmitter-receiver pairs than the randomly selected set.

11. A method for adaptive clustering of transmitter-receiver pairs, the method comprising:

selecting a cluster of transmitter-receiver pairs having greatest of a minimum singular value of direct channel information above a threshold; and instructing the pairs of the selected cluster to perform an interference alignment technique when a target throughput rate can be achieved, wherein performing the interference alignment technique provides an increase an overall achievable throughput for the pairs of the selected cluster, wherein, in response to the instructing, a transmitter of each transmitter-receiver pair of the selected cluster is configured to precode baseband signals in accordance with the interference alignment technique for transmission to an associated receiver of each transmitter-receiver pair using channel state information, wherein the channel state information comprises both a direct-channel gain estimate and a cross-channel gain estimate, wherein the direct channel information comprises the direct-channel gain estimate, wherein the interference alignment technique comprises limiting interfering signals to a smaller signal space for improved decoding of desired signals, and wherein each transmitter-receiver pair is assigned a non-orthogonal channel resource for concurrent communication.

12. A central scheduler for a distributed wireless network configured to schedule communications between transmitters and receivers of a plurality of transmitter-receiver pairs of the distributed wireless network, wherein each transmitter-receiver pair includes a transmitter and an associated receiver, the central scheduler comprising:

circuitry to calculate a minimum singular value from direct channel information of a direct channel between a transmitter and receiver of each of the transmitter-receiver pairs;

circuitry to select a cluster of the transmitter-receiver pairs having greatest of the minimum singular values above a threshold calculated for each of the transmitter-receiver pairs; and circuitry to instruct the transmitter-receiver pairs of the selected cluster to perform an interference alignment technique for direct communications therebetween when a target throughput rate can be achieved, wherein in response to being instructed by the central scheduler, each transmitter of the selected cluster is configured to precode baseband signals in accordance with the interference alignment technique for transmission to an associated receiver of the selected cluster using the channel state information, and wherein each transmitter of the selected cluster is configured to concurrently transmit the precoded signals to an associated receiver using non-orthogonal subcarriers.

13. A central scheduler for a wireless network comprising:

circuitry to calculate a minimum singular value from direct channel information of each of a plurality of transmitter-receiver pairs;

circuitry to select a cluster of the transmitter-receiver pairs having greatest of the minimum singular values above a threshold calculated for each of the pairs;

circuitry to instruct the pairs of the selected cluster to perform an interference alignment technique when a target throughput rate can be achieved; and circuitry to calculate a sum rate for the transmitter-receiver pairs of the selected cluster, wherein the circuitry to instruct is configured to instruct the pairs of the selected cluster to perform the interference alignment technique when the sum rate meets or exceeds the target throughput rate, and wherein the sum rate is calculated by summing a throughput of each of the transmitter-receiver pairs of the selected cluster if the pairs were to perform the interference alignment technique.

14. The central scheduler of claim 13
wherein when the sum rate does not meet or exceed the target throughput rate, the circuitry to select a cluster is further configured to:

randomly select a set of transmitter-receiver pairs from the plurality;

compute an achievable sum rate for each possible cluster of pairs within the selected set;

select the cluster with the highest achievable sum rate from the possible clusters; and instruct the pairs of the selected cluster to perform the interference alignment technique.

15. The central scheduler of claim 14 wherein the randomly selected set comprises a predetermined number of transmitter-receiver pairs, and wherein each cluster comprises a subset having less transmitter-receiver pairs than the randomly selected set.

* * * * *